United States Patent
Abe

(10) Patent No.: US 6,366,405 B2
(45) Date of Patent: Apr. 2, 2002

(54) DIFFRACTIVE-REFRACTIVE ACHROMATIC LENS

(75) Inventor: Tetsuya Abe, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/873,332

(22) Filed: Jun. 5, 2001

Related U.S. Application Data

(62) Division of application No. 09/244,077, filed on Feb. 4, 1999.

(30) Foreign Application Priority Data

Feb. 5, 1998 (JP) .............................................. 10-24789

(51) Int. Cl.$^7$ .............................................. G02B 27/44
(52) U.S. Cl. ........................ 359/566; 359/565; 359/569
(58) Field of Search ................................. 359/566, 565, 359/569, 795, 790, 571, 16

(56) References Cited

U.S. PATENT DOCUMENTS

| | | | | |
|---|---|---|---|---|
| 4,190,324 A | * | 2/1980 | Arai ............................ | 359/789 |
| 5,568,325 A | * | 10/1996 | Hirano et al. ................ | 359/785 |
| 5,790,321 A | * | 8/1998 | Goto ........................... | 359/571 |
| 5,818,632 A | * | 10/1998 | Stephenson .................. | 359/566 |
| 5,949,577 A | * | 9/1999 | Ogata .......................... | 359/570 |
| 5,959,785 A | * | 9/1999 | Adachi ........................ | 359/692 |
| 5,973,859 A | * | 10/1999 | Abe ............................ | 359/794 |
| 6,226,132 B1 | * | 5/2001 | Abe ............................ | 359/797 |

* cited by examiner

Primary Examiner—Audrey Chang
Assistant Examiner—Jennifer Winstedt
(74) Attorney, Agent, or Firm—Greenblum & Bernstein, P.L.C.

(57) ABSTRACT

A diffractive-refractive achromatic lens that has a positive resultant power includes a refractive lens system and a positive diffractive grating. The refractive lens system is provided with a positive lens having relatively small dispersion, a negative lens having relatively large dispersion and an additional refractive lens. The additional refractive lens is a positive lens. The refractive lens system exhibits longitudinal chromatic aberration that is substantially proportional to wavelength such that the back focus of the refractive lens system decreases as the wavelength becomes shorter. The positive diffractive grating corrects the longitudinal chromatic aberration of the refractive lens system. The condition $0.005 < f/f_D < 0.2$ is satisfied where f is the focal length of the entire lens system, and $f_D$ is the focal length of said positive diffractive grating.

10 Claims, 15 Drawing Sheets

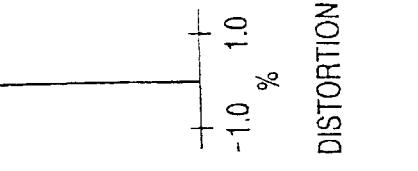
FIG. 1
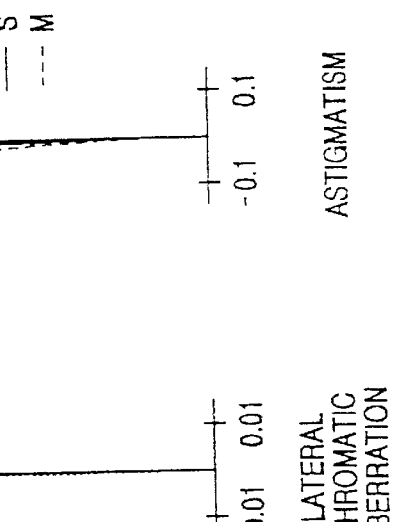
FIG. 2A FNO = 6.7
— d-LINE
······ g-LINE
--- C-LINE
FIG. 2B W:1.4
FIG. 2C W:1.4
— S
--- M
FIG. 2D W:1.4
SPHERICAL ABERRATION CHROMATIC ABERRATION
LATERAL CHROMATIC ABERRATION
ASTIGMATISM
DISTORTION FIG. 4A  FNO = 6.7
— d-LINE
⋯ g-LINE
--- C-LINE
-0.1  0.1
SPHERICAL ABERRATION
CHROMATIC ABERRATION

FIG. 4B  W:1.4
-0.01  0.01
LATERAL CHROMATIC ABERRATION

FIG. 4C  W:1.4
— S
--- M
-0.1  0.1
ASTIGMATISM

FIG. 4D  W:1.4
-1.0  1.0
%
DISTORTION

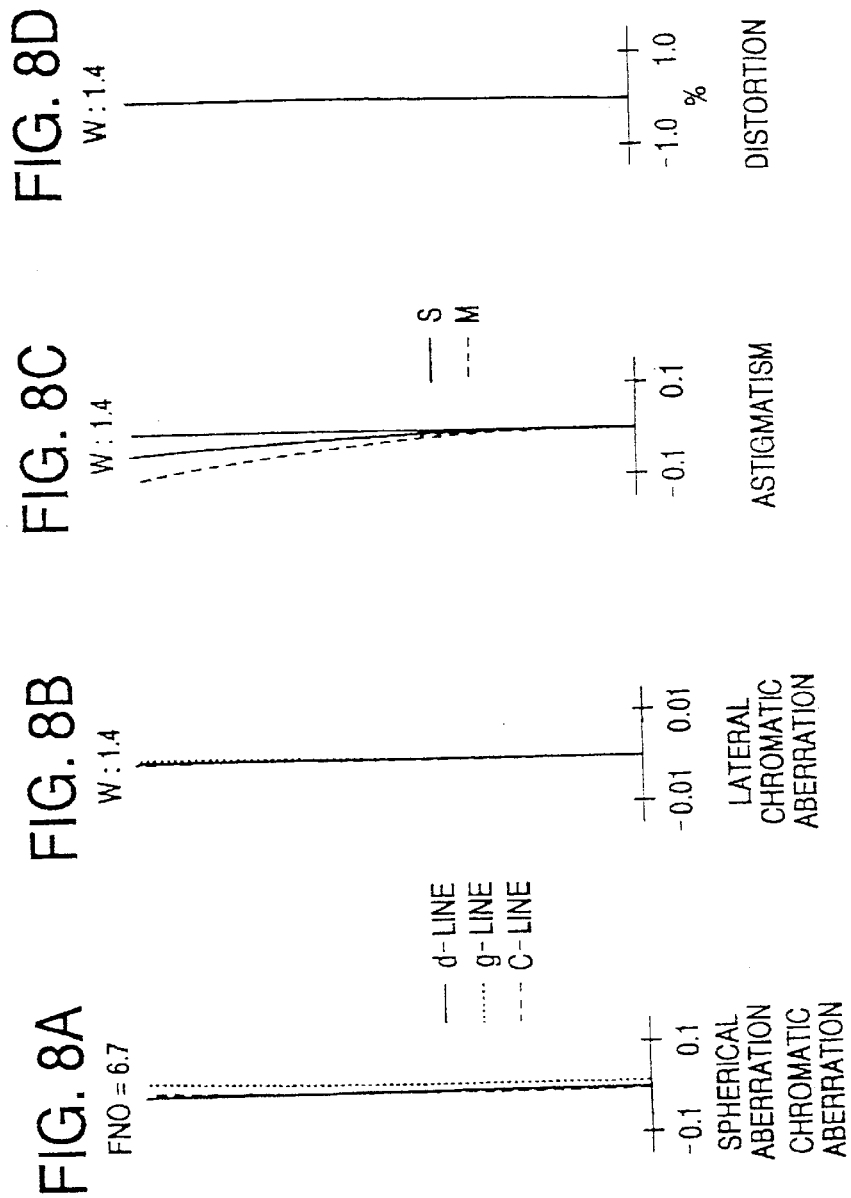

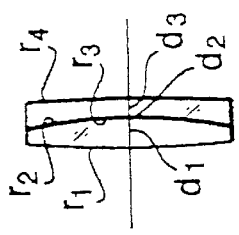
FIG. 9
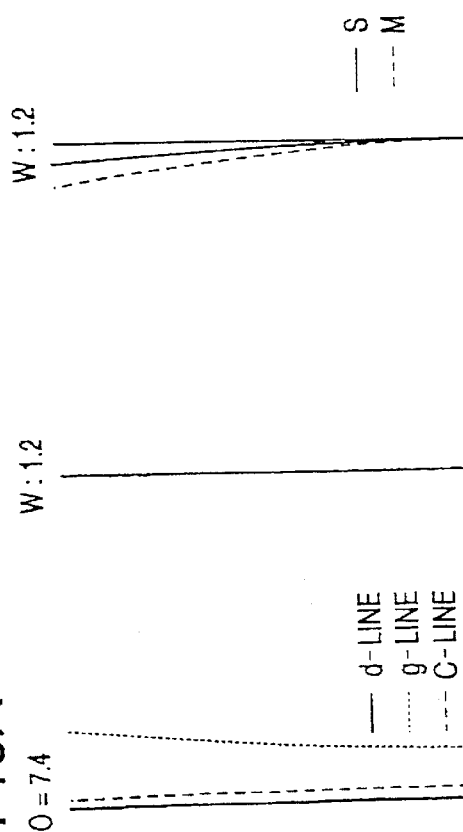
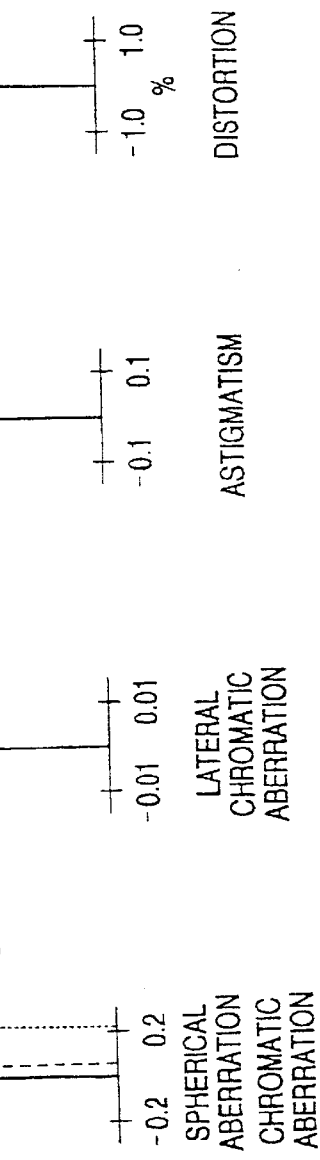

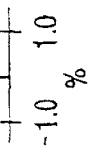
FIG. 11
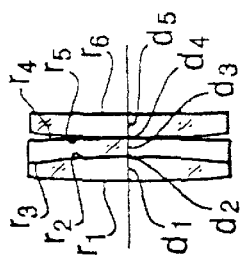
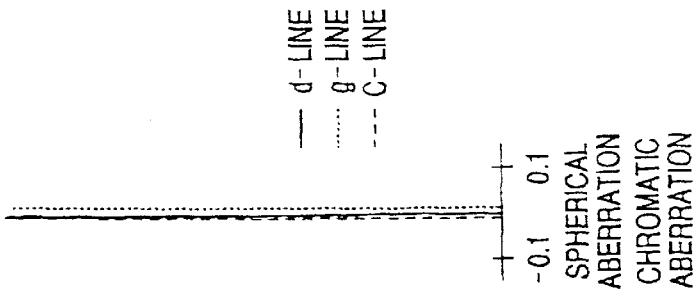
FIG. 12A
FNO = 6.7
— d-LINE
··· g-LINE
--- C-LINE
-0.1  0.1
SPHERICAL
ABERRATION
CHROMATIC
ABERRATION
FIG. 12B
W: 1.4
-0.01  0.01
LATERAL
CHROMATIC
ABERRATION
FIG. 12C
W: 1.4
— S
--- M
-0.1  0.1
ASTIGMATISM
FIG. 12D
W: 1.4
-1.0  1.0
%
DISTORTION

FNO = 7.9

W: 1.2

W: 1.2

W: 1.2

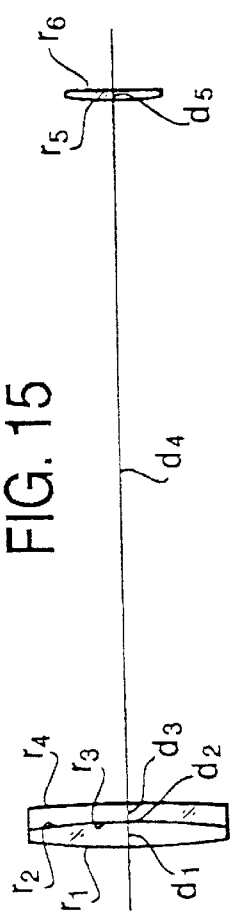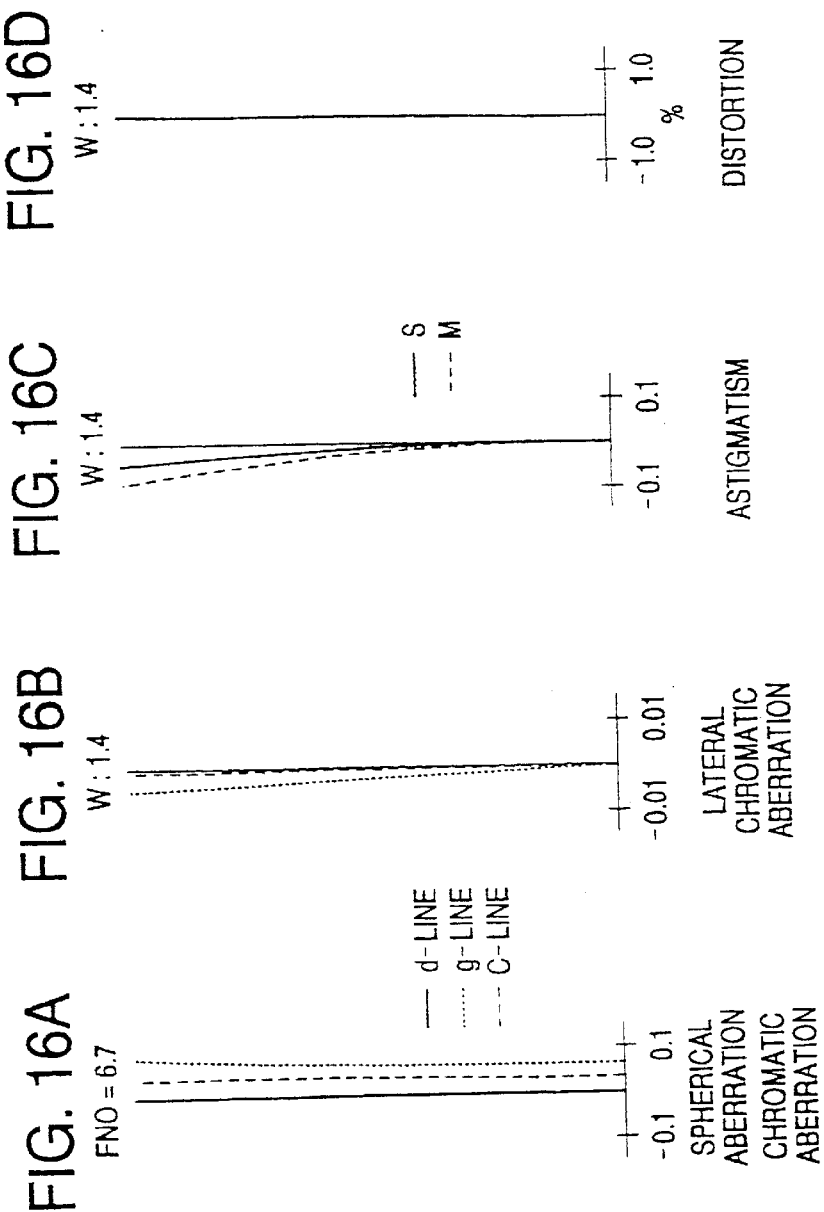

FNO = 8.0
SPHERICAL ABERRATION CHROMATIC ABERRATION
— d-LINE
······ g-LINE
--- C-LINE

W:1.1
LATERAL CHROMATIC ABERRATION

W:1.1
ASTIGMATISM
— S
--- M

W:1.1
DISTORTION

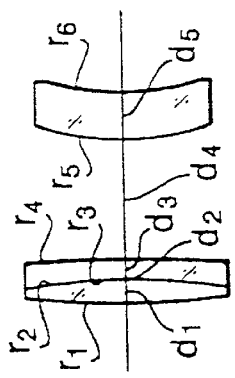
FIG. 19
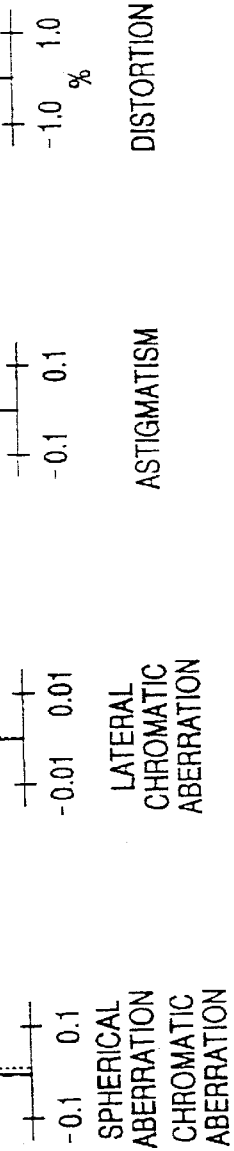
FIG. 20A
FNO = 6.7
SPHERICAL ABERRATION CHROMATIC ABERRATION
FIG. 20B
W : 1.4
LATERAL CHROMATIC ABERRATION
FIG. 20C
W : 1.4
ASTIGMATISM
FIG. 20D
W : 1.4
DISTORTION

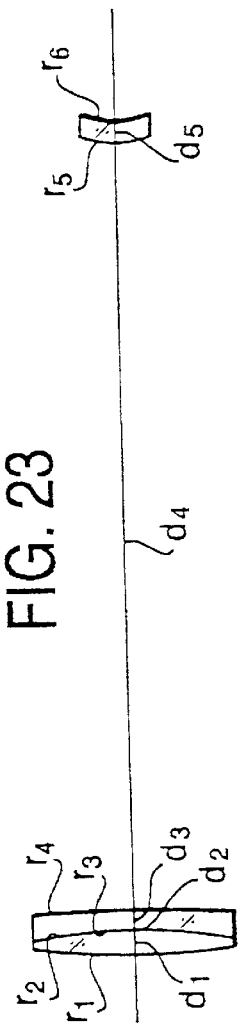
FIG. 23
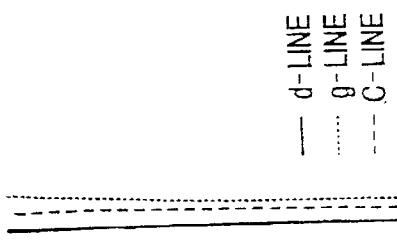
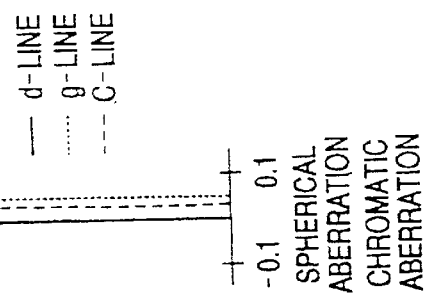

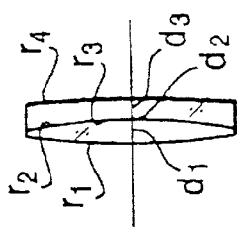
FIG. 25
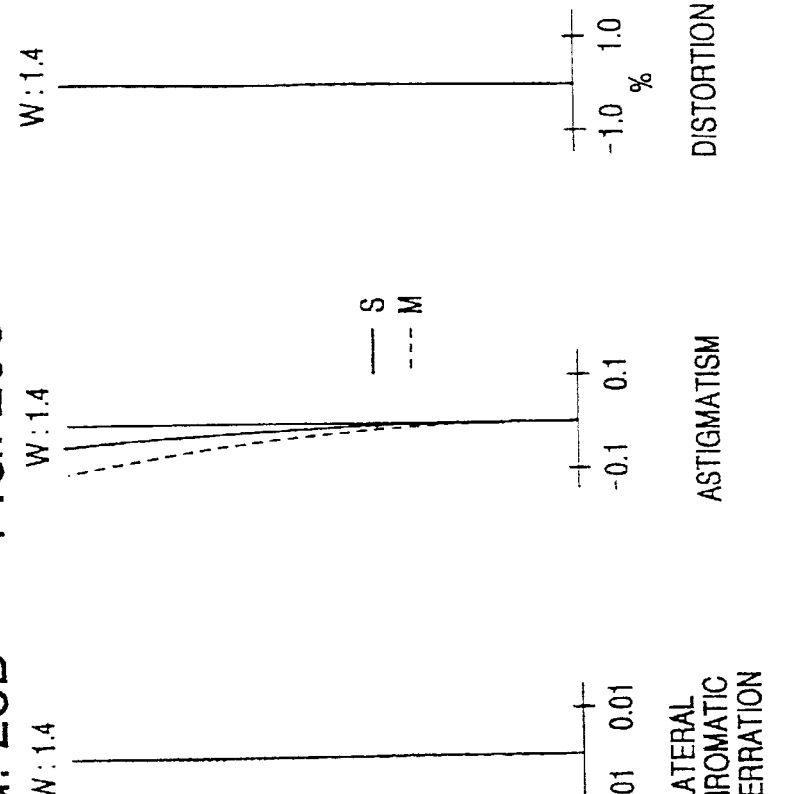

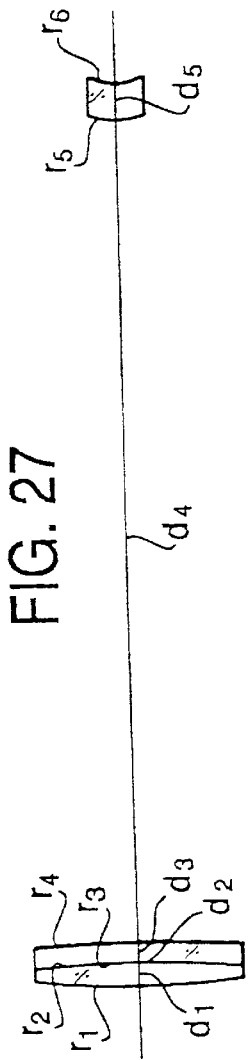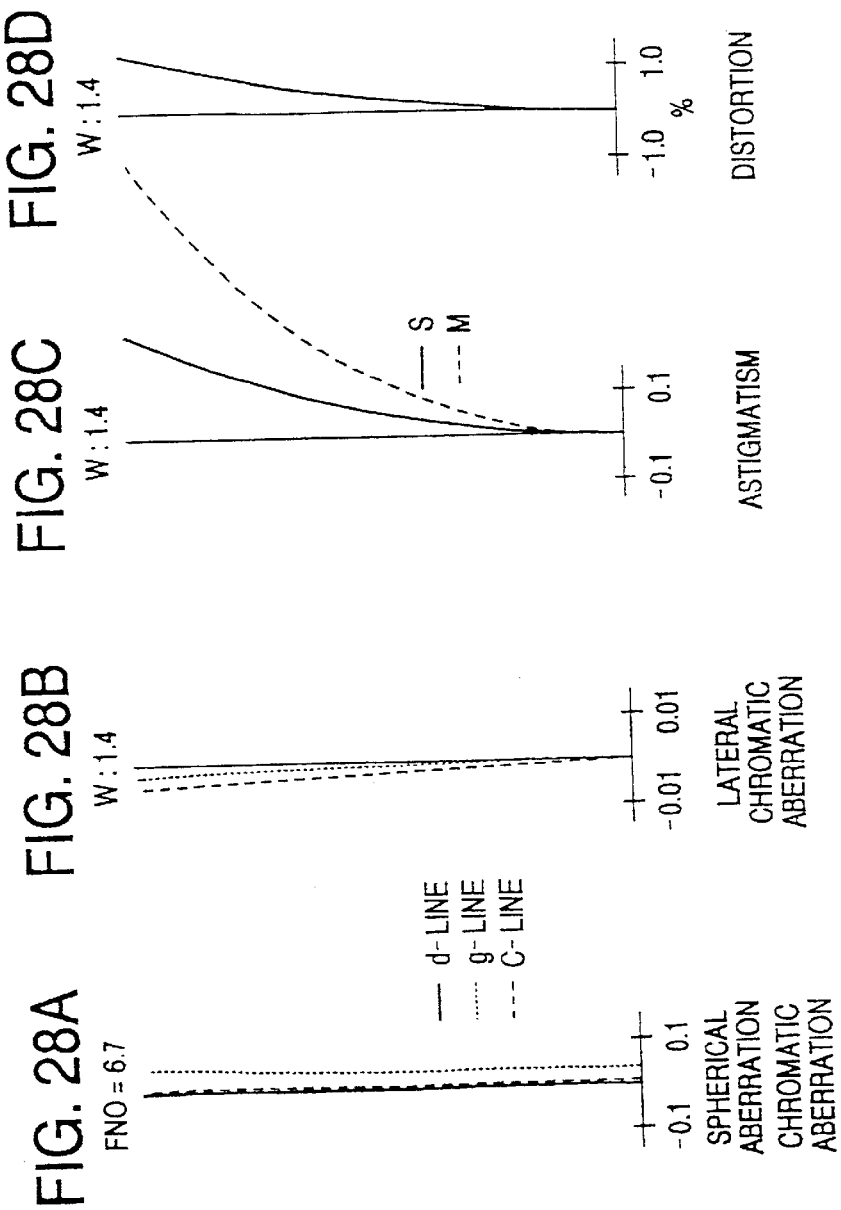

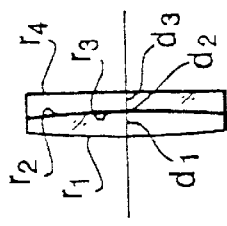
FIG. 29
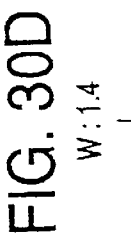
FIG. 30A
FNO = 6.7
— d-LINE
······ g-LINE
--- C-LINE
-0.2  0.2
SPHERICAL
ABERRATION
CHROMATIC
ABERRATION
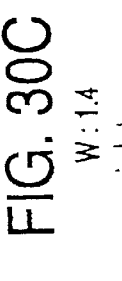
FIG. 30B
W : 1.4
-0.01  0.01
LATERAL
CHROMATIC
ABERRATION
FIG. 30C
W : 1.4
— S
--- M
-0.1  0.1
ASTIGMATISM
FIG. 30D
W : 1.4
-1.0  1.0
%
DISTORTION

DIFFRACTIVE-REFRACTIVE ACHROMATIC LENS

CROSS-REFERENCE TO RELATED APPLICATIONS

This application is a Divisional of U.S. application Ser. No. 09/244,077, filed Feb. 4, 1999, the contents of which are herein incorporated by reference in its entirety.

BACKGROUND OF THE INVENTION

The present invention relates to an achromatic lens to be used as a collimator lens, or an objective lens for a telescope. Particularly, the present invention relates to a diffractive/refractive achromatic lens that includes a refractive lens system provided with a diffractive grating.

Conventionally, an achromatic lens has been well known and used as a collimator lens or an objective lens. An example of the achromatic lens employs two thin lenses: one being a lens having large positive power that is made from crown glass having relatively low dispersion; and the other being a lens having small negative power that is made from flint glass having relatively high dispersion. The resultant power is therefore positive, while the dispersion is neutralized.

Since optical glass has dispersion such that refractive index thereof increases with decreasing wavelength of light, a positive refractive lens has longitudinal chromatic aberration where a back focus of the lens decreases as wavelength becomes shorter. The achromatic doublet corrects the chromatic aberration of the positive lens by using a negative lens that has opposite chromatic aberration.

The conventional achromatic doublet is designed for correcting the longitudinal chromatic aberration with respect to two different wavelengths, e.g., F-line (486 nm) and C-line (656 nm). That is, the light beams of F-line and C-line are focused on substantially the same focal point.

However, light beams having wavelengths except the C- and F-lines are not focused on the same focal point. Particularly, the back focus of the doublet becomes remarkably larger in a range shorter than F-line. This remaining chromatic aberration is called as secondary spectrum.

If the normal optical glasses are used for constituting the conventional type of the achromatic lens, it is impossible to correct the secondary spectrum sufficiently. Because refractive index of glass increases as wavelength becomes shorter as described, while increasing degree of the flint glass is larger than that of the crown glass in short wavelength range. Then the chromatic aberration of the doublet is overcorrected (backfocus becomes too long) in the range shorter than F-line.

In order to suppress the secondary spectrum of the longitudinal chromatic aberration with the conventional type of the achromatic lens, fluorite or anomalous dispersion glass should be used. However, these materials are too expensive.

SUMMARY OF THE INVENTION

It is therefore an object of the present invention to provide an achromatic lens., which is capable of correcting the secondary spectrum of the longitudinal chromatic aberration without using expensive material such as the fluorite or anomalous dispersion glass.

For the above object, according to the present invention, there is provided a diffractive-refractive achromatic lens that includes a refractive lens system exhibiting longitudinal chromatic aberration that is substantially proportional to wavelength such that the back focus of the refractive lens system decreases as the wavelength becomes shorter, and a positive diffractive grating for correcting the longitudinal chromatic aberration of the refractive lens system.

The refractive lens system having such a chromatic aberration includes a positive lens having relatively small dispersion and a negative lens having relatively large dispersion. Further, the following condition (1) should be satisfied:

$$0.005 < f/f_D < 0.2 \qquad (1)$$

where
  f is a focal length of the entire lens system, and
  $f_D$ a is focal length of the positive diffractive grating.

Preferably, the diffractive grating may be designed so that the following condition (2) is satisfied:

$$-0.05 < P_4/P_2 < 0.0 \qquad (2)$$

where
  $P_2$ and $P_4$ are diffractive coefficients of second and fourth orders when the diffractive grating is expressed by the following optical path difference function $\Phi(h)$:

$$\Phi(h) = (P_2 h^2 + P_4 h^4 + \ldots) \times \lambda$$

where
  h is a height from the optical axis, and
  $\lambda$ is a design wavelength of the diffractive grating.

Embodiments described in this specification includes three groups. In a first group of the embodiments, the refractive lens system includes a non-achromatic doublet. In the second and third groups of embodiments, the refractive lens system consists of a combination of a refractive achromatic lens and an additional lens. In each case, the diffractive grating could be formed on one surface of the refractive lenses or provided as a separate diffractive element.

In the first group of the embodiments, the doublet should have longitudinal chromatic aberration such that the back focus of the refractive lens system decreases as the wavelength becomes shorter. In such a case, it is preferable that the refractive lens system satisfies the following condition (3);

$$0.001 < f_c \cdot \sum_{i=1}^{m} \frac{1}{f_i \cdot v_i} < 0.02 \qquad (3)$$

where
  $f_c$ is a focal length of the refractive lens system,
  $f_i$ is a focal length of an i-th lens of the refractive lens system counted from the object side,
  $v_i$ is an Abbe number of the i-th lens of the refractive lens system counted from the object side, and
  m is a total number of lenses of the refractive lens system.

In the second and third groups of the embodiments, the refractive achromatic lens is corrected in chromatic aberration at two different wavelengths and an additional refractive lens generates longitudinal chromatic aberration such that the back focus of the refractive lens system decreases as the wavelength becomes shorter. In such a case, it is preferable that the refractive achromatic lens satisfies the following condition (4);

$$\left| f_l \cdot \sum_{i=1}^{m} \frac{1}{f_i \cdot v_i} \right| < 0.002 \quad (4)$$

where
    $f_l$ is a focal length of the refractive achromatic lens,
    $f_i$ is a focal length of an i-th lens of the refractive achromatic lens counted from the object side,
    $v_i$ is an Abbe number of the i-th lens of the refractive achromatic lens counted from the object side, and
    m is a total number of lenses of the refractive achromatic lens.

In the second group of the embodiments, the additional refractive lens is an additional positive lens. In such a case, it is preferable that the additional positive lens satisfies the following condition (5):

$$0.05 < (f_p \cdot v_p)/f < 0.5 \quad (5)$$

where
    $f_p$ is a focal length of the additional positive lens, and
    $v_p$ is an Abbe number of the additional positive lens.

In the third group of the embodiment, the additional lens and the diffractive grating are arranged at a convergent side of the refractive achromatic lens, and the additional refractive lens includes a lens having a convex surface directed to the refractive achromatic lens. In such a case, it is preferable that the lens having the convex surface satisfies the following conditions (6) and (7);

$$0.01 < r_{H1}/(f_f-L) < 0.5 \quad (6)$$

$$0.01 < d_H/f < 0.1 \quad (7)$$

where
    $r_{H1}$ is a radius of curvature of the convex surface,
    L is an air gap along the optical axis between the refractive achromatic lens and the additional refractive lens, and
    $d_H$ is a thickness of the lens having the convex surface.

The convergent side is defined as the side where the light beam is convergent. For example, the convergent side is an incident side when the invention is applied to a collimator lens, and an image side when the invention is applied to the objective lens.

In any groups of the embodiments, when the diffractive grating is formed on the optical element, which may be a separate element from the refractive lens system or the additional refractive lens, that is arranged at a convergent side of the refractive lens system, it is preferable that the following condition (8) is satisfied;

$$0.4 < L/f < 0.9 \quad (8)$$

where
    L is an air gap along the optical axis between the non-achromatic doublet and the diffractive element (for the first group of the embodiments) or an air gap along the optical axis between the refractive achromatic lens and the additional refractive lens (for the second and third groups of the embodiments).

In the second and third groups of the embodiments, a conventional achromatic lens can be used as the refractive achromatic lens. In the other words, the combination of the additional refractive lens and the diffractive grating can be used as an attachment for the conventional achromatic lens to reduce the secondary spectrum of the longitudinal chromatic aberration.

DESCRIPTION OF THE ACCOMPANYING DRAWINGS

FIG. 1 is a lens diagram of the diffractive-refractive chromatic lens according to a first embodiment;

FIGS. 2A through 2D are graphs showing spherical aberration, lateral chromatic aberration, astigmatism and distortion, respectively, of the lens in FIG. 1;

FIGS. 4A through 4D are graphs showing spherical aberration, lateral chromatic aberration, astigmatism and distortion, respectively, of the lens in FIG. 3;

FIG. 7 is a lens diagram of the diffractive-refractive achromatic lens according to a fourth embodiment;

FIGS. 8A through 8D are graphs showing spherical aberration, lateral chromatic aberration, astigmatism and distortion, respectively, of the lens in FIG. 7;

FIG. 9 is a lens diagram of the second and third lenses of the lens in FIG. 7;

FIGS. 10A through 10D are graphs showing spherical aberration, lateral chromatic aberration, astigmatism and distortion, respectively, of the lens in FIG. 9;

FIG. 11 is a lens diagram of the diffractive-refractive achromatic lens according to a fifth embodiment;

FIGS. 12A through 12D are graphs showing spherical aberration, lateral chromatic aberration, astigmatism and distortion, respectively, of the lens in FIG. 11;

FIG. 15 is a lens diagram of the diffractive-refractive achromatic lens according to a sixth embodiment;

FIGS. 16A through 16D are graphs showing spherical aberration, lateral chromatic aberration, astigmatism and distortion, respectively, of the lens in FIG. 15;

FIG. 19 is a lens diagram of the diffractive-refractive achromatic lens according to a seventh embodiment;

FIGS. 20A through 20D are graphs showing spherical aberration, lateral chromatic aberration, astigmatism and distortion, respectively, of the lens in FIG. 19;

FIG. 23 is a lens diagram of the diffractive-refractive achromatic lens according to a eighth embodiment;

FIGS. 24A through 24D are graphs showing spherical aberration, lateral chromatic aberration, astigmatism and distortion, respectively, of the lens in FIG. 23;

FIG. 25 is a lens diagram of the first and second lenses of the lens in FIG. 23;

FIGS. 26A through 26D are graphs showing spherical aberration, lateral chromatic aberration, astigmatism and distortion, respectively, of the lens in FIG. 25;

FIG. 27 is a lens diagram of the diffractive-refractive achromatic lens according to a ninth embodiment;

FIGS. 28A through 28D are graphs showing spherical aberration, lateral chromatic aberration, astigmatism and distortion, respectively, of the lens in FIG. 27;

FIG. 29 is a lens diagram of the first and second lenses of the lens in FIG. 27; and FIGS. 30A through 30D are graphs showing spherical aberration, lateral chromatic aberration, astigmatism and distortion, respectively, of the lens in FIG. 29.

DESCRIPTION OF THE EMBODIMENTS

Figure 3:
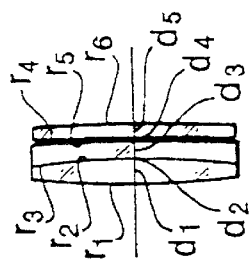
FIG. 3 is a lens diagram of the diffractive-refractive achromatic lens according to a second embodiment.

A diffractive-refractive achromatic lens according to the present invention includes: a refractive lens system that includes a positive lens made from crown-glass having relatively small dispersion; a negative lens made from flint-glass having relatively large dispersion; and a diffractive grating for correcting the longitudinal chromatic aberration of the refractive lens system.

Secondary spectrum of the longitudinal chromatic aberration cannot be corrected only by the refractive achromatic lens system made from the crown glass and the flint glass, while it is possible to choose a combination of glasses such that the refractive lens system exhibits longitudinal chromatic aberration that is substantially proportional to wavelength, i.e., the back focus of the refractive lens system decreases as the wavelength becomes shorter. For example, the combination is obtained by decreasing power or dispersion of a negative lens of a conventional achromatic doublet.

On the other hand, it is known that a value corresponding to Abbe number for a diffractive lens is equal to −3.453. The negative sign of the value reflects the opposite sense of the dispersion when compared with that of glasses, and its low magnitude is an indication of the large dispersion. That is, the positive diffractive lens has a longitudinal chromatic aberration such that back focus increases as wavelength becomes shorter. It is also known that the chromatic aberration of the diffractive grating is substantially proportional to wavelength.

Therefore, a use of a diffractive grating having small positive power in association with the refractive lens system having the chromatic aberration proportional to wavelength enables to reduce secondary spectrum of longitudinal chromatic aberration.

The diffractive-refractive lens of the embodiments satisfies the following condition (1):

$$0.005 < f/f_D < 0.2 \quad (1)$$

where f is focal length of the entire lens system, and $f_D$ is focal length of the positive diffractive grating.

Condition (1) defines the ratio of the focal length of the entire system to the focal length of the diffractive grating to reduce the secondary spectrum of the longitudinal chromatic aberration. If the ratio is smaller than the lower limit, the diffractive power is too small to correct the secondary spectrum. If the ratio is larger than the upper limit, the chromatic aberration is overcorrected by the diffractive grating, the secondary spectrum cannot be well corrected.

The diffractive grating is expressed by the following optical path difference function Φ(h):

$$\Phi(h)=(P_2h^2+P_4h^4+P_6h^6+P_8h^8+P_{10}h^{10})$$

where $P_2$, $P_4$, $P_6$, $P_8$, $P_{10}$ are diffractive coefficients of second, fourth, sixth, eighth and tenth orders, h is a height from the optical axis, and λ is a design wavelength of the diffractive grating.

The unit of the function Φ(h) is λ (wavelength). The function Φ(h) represents an optical path difference between an imaginary ray that is assumed not to be diffracted by the grating and an actual ray that is diffracted by the grating, at a point on the grating where the height from the optical axis is h. In such an expression, a negative value of the second order coefficient $P_2$ represents a positive paraxial power of the diffractive grating. Further, the negative power increases with increasing the distance from the optical axis when the fourth order coefficient $P_4$ is larger than zero.

An actual microscopic shape of the diffractive grating is defined like a Fresnel lens having a large number of concentric rings. The actual shape Φ'(h) is defined by subtracting λ×m (m: integer) from Φ(h) as follows.

$$\Phi'(h)=(MOD(P_2h^2+P_4h^4+ \ldots +Const, 1)-Const)\times\lambda$$

Const is a constant defining a phase difference at a boundary between adjacent rings (0<Const<1). The function MOD(x, y) finds a residue when x is divided by y. MOD ($P_2h^2+P_4h^4+ \ldots$ +Const, 1) is equal to zero at the boundary.

A general achromatic doublet exhibits spherochromatism such that the spherical aberration becomes greater as the wavelength becomes shorter. On the other hand, the diffractive grating of the present invention has longitudinal chromatic aberration such that the back focus of the diffractive grating becomes longer as wavelength becomes shorter. If the diffractive power decreases as a height from an optical axis increases, the spherochromatism can be reduced.

If the following condition (2) is satisfied, the diffractive grating has the diffractive power distribution to reduce the spherochromatism.

$$-0.05 < P4/P_2 < 0.0. \quad (2)$$

If the ratio is smaller than the lower limit, the spherochromatism is overcorrected. If the ratio is larger than the upper limit, the power variation of the diffractive grating is too short to correct the spherochromatism.

There are nine embodiments described hereinafter The refractive lens system includes a non-achromatic doublet in first, second and third embodiments. In fourth through ninth embodiments, the refractive lens system consists of a combination of a refractive achromatic lens and an additional lens. In any cases, the diffractive grating is preferably formed on one surface of the lenses to reduce both manufacturing cost and size.

In the first, second and third embodiments, the doublet should have longitudinal chromatic aberration that is substantially proportional to wavelength such that the back focus of the refractive lens system decreases as the wavelength becomes shorter in such a case where the refractive lens system consists of a non-achromatic doublet, it is preferable that the refractive lens system satisfies the following condition (3);

$$0.001 < f_c \cdot \sum_{i=1}^{m} \frac{1}{f_i \cdot v_i} < 0.02 \tag{3}$$

where $f_c$ is a focal length of the refractive lens system, $f_i$ is a focal length of an i-th lens of the refractive lens system counted from the object side, $v_i$ is an Abbe number of the i-th lens of the refractive lens system counted from the object side, and m is a total number of lenses of the refractive lens system.

Condition (3) defines the chromatic aberration of the refractive lens system that is suitable to be corrected by the diffractive grating. If the value is smaller than the lower limit, the correction effect of the negative lens becomes too large to obtain chromatic aberration proportional to wavelength. If the value is larger than the upper limit, the correction effect of the negative lens becomes too small to obtain chromatic aberration proportional to wavelength.

In the fourth through ninth embodiments, the refractive lens system includes a refractive achromatic lens and an additional refractive lens. The refractive achromatic lens is corrected in chromatic aberration at two different wavelengths, while secondary spectrum cannot be corrected. Thus, the back focus of the refractive achromatic lens increases as wavelength becomes shorter in a range shorter than F-line. On the other hand, the additional refractive lens is designed so that the refractive lens system, which is a combination of the refractive achromatic lens and the additional refractive lens, generates longitudinal chromatic aberration that is substantially proportional to wavelength such that the back focus of the refractive lens system decreases as the wavelength becomes shorter. The proportional chromatic aberration of the refractive lens system can be corrected by the diffractive grating.

In these embodiments, since the refractive achromatic lens can be selected from conventional achromatic lenses, an attachment that includes the positive refractive lens and the diffractive grating is only required as an additional component.

In such a case where the optical system includes the achromatic doublet, the additional refractive lens and the diffractive grating, it is preferable that the refractive achromatic lens satisfies the following condition (4);

$$\left| f_I \cdot \sum_{i=1}^{m} \frac{1}{f_i \cdot v_i} \right| < 0.002 \tag{4}$$

where $f_I$ is a focal length of the refractive achromatic lens, $f_i$ is a focal length of an i-th lens of the refractive achromatic lens counted from the object side, $v_i$ is an Abbe number of the i-th lens of the refractive achromatic lens counted from the object side, and m is a total number of the refractive achromatic lens.

Condition (4) defines chromatic aberration of the refractive achromatic lens that is well corrected in itself. If the value exceeds the limit, the chromatic aberration becomes too large to use the refractive achromatic lens as a single unit.

In the fourth, fifth and sixth embodiments, the additional refractive lens is an additional positive lens. In such a case, it is preferable that the additional positive lens satisfies the following condition (5):

$$0.05 < (f_p \cdot v_p)/f < 0.5 \tag{5}$$

where $f_p$ is a focal length of the additional positive lens, and $v_p$ is an Abbe number of the additional positive lens.

Condition (5) defines the chromatic aberration of the additional positive lens such that the chromatic aberration of the refractive lens system, which consists of the refractive chromatic lens and the additional positive lens, is suitable to be corrected by the diffractive grating. If the ratio is smaller than the lower limit, the chromatic aberration of the additional positive lens becomes too small to obtain chromatic aberration proportional to wavelength. If the ratio is larger than the upper limit, the chromatic aberration of the additional positive lens becomes too large to obtain chromatic aberration proportional to wavelength.

In the seventh, eighth and ninth embodiments, the additional lens and the diffractive grating is arranged at a convergent side of the refractive achromatic lens, and the additional refractive lens includes a lens having a convex surface directed to the refractive achromatic lens.

With this construction, since paraxial marginal rays from the refractive achromatic lens are strongly converged by the strong convex surface of the additional refractive lens, it generates chromatic aberration such that the back focus decreases as the wavelength becomes shorter. The other surface of the additional refractive lens does not generate large chromatic aberration, because incident height of the paraxial marginal rays converged by the strong positive surface at the other surface become small. Since the required longitudinal chromatic aberration for the additional refractive lens is generated by the strong convex surface, the additional refractive lens may have positive or negative refractive power.

In the seventh, eighth and ninth embodiments, it is preferable that the lens having the convex surface satisfies the following conditions (6) and (7);

$$0.01 < r_{II1}/(f_I-L) < 0.5 \tag{6}$$

$$0.01 < d_{II}/f < 0.1 \tag{7}$$

where $r_{II1}$ is a radius of curvature of the convex surface,

L is an air gap along the optical axis between the refractive achromatic lens and the additional refractive lens, and $d_{II}$ is a thickness of the lens having the convex surface.

Condition (6) defines the curvature of the convex surface to generate suitable longitudinal chromatic aberration with maintaining imaging characteristic. If the ratio is smaller than the lower limit, spherical aberration and coma become too large, which lowers the imaging characteristic. If the ratio is larger than the upper limit, the proportional chromatic aberration of the refracting lens system cannot be obtained.

Condition (7) defines the thickness of the additional refractive lens having convex surface to reduce the chromatic aberration caused by the surface opposite to the strong convex surface with reducing weight of the additional refractive lens. If the ratio is smaller than the lower limit, the incident height of the paraxial marginal rays at the opposite surface to the convex surface becomes too large to ignore the chromatic aberration caused by the opposite surface, the chromatic aberration proportional to wavelength may not be obtained even if the condition (6) is satisfied. If the ratio is larger than the upper limit, the thickness of the additional refractive lens becomes so large that cost and weight increase.

When the diffractive grating is formed on the lens surface as a diffractive-refractive surface, the larger the diameter of the surface is, the higher the manufacturing cost is. Thus, when the diffractive grating is formed on the optical element or the additional refractive lens that is arranged at a convergent side of the refractive lens system, it is preferable that the following condition (8) is satisfied;

$$0.4 < L/f < 0.9 \qquad (8)$$

where

L is an air gap along the optical axis between the non-achromatic doublet and the diffractive element (for the third embodiments) or an air gap along the optical axis between the refractive achromatic lens and the additional refractive lens (for the sixth, eighth and ninth embodiments).

Condition (8) defines the air gap along the optical axis between the refractive lens and the diffractive grating to reduce the diameter of the diffractive grating. If the ratio is smaller than the lower limit, the diameter of the diffractive grating becomes too large to reduce the manufacturing cost. If the ratio is larger than the upper limit, incident height of the paraxial marginal rays at the diffractive grating becomes too small to generate the required longitudinal chromatic aberration with small power. Increasing of the power of the diffractive grating generates the required chromatic aberration, while it requires large number of rings on the diffractive grating that is difficult to manufacture.

[First Embodiment]

FIG. 1 shows a diffractive-refractive achromatic lens according to a first embodiment. The numerical construction thereof is described in TABLE 1. The lens includes a biconvex first lens and a negative meniscus second lens arranged in this order from an object side (left-hand in FIG. 1). The first and second lenses are a no-achromatic separated doublet. The surface #1 is formed as a diffractive-refractive surface, where the diffractive grating pattern is formed on an aspherical convex surface.

In TABLE 1, f (mm) denotes the entire focal length, Fno. denotes F-number, r (mm) denotes a radius of curvature of a surface (the values at the vertex for aspherical surface), d (mm) denotes a distance between the surfaces along the optical axis, n denotes a refractive index at a wavelength of 588 nm and vd denotes an Abbe number.

TABLE 1

| | f = 100.00 | Fno. = 6.7 | | |
|---|---|---|---|---|
| Surface Number | r | d | n | vd |
| #1 | 47.517 | 2.00 | 1.49176 | 57.4 |
| #2 | −48.965 | 0.10 | — | — |
| #3 | −61.462 | 1.50 | 1.67270 | 32.1 |
| #4 | −1723.640 | | | |

An aspherical surface is expressed by the following equation:

$$X(h) = \frac{h^2 c}{1 + \sqrt{1 - (1+K)h^2 c^2}} + A_4 h^4 + A_6 h^6 + A_8 h^8 + A_{10} h^{10}$$

X(h) is a SAG, that is, a distance of a curve from a tangential plane at a point on the surface where the height from the optical axis is h. C is a curvature (1/r) of the vertex of the surface, K is a conic constant, $A_4$, $A_6$, $A_8$ and $A_{10}$ are aspherical surface coefficients of fourth, sixth, eighth and tenth orders. The constant K and coefficients $A_4$ and $A_6$ of the object side surface of the first lens are shown in the following TABLE 2.

Further, TABLE 2 indicates diffractive coefficients of second, fourth, sixth, eighth and tenth orders $P_2$, $P_4$, $P_6$, $P_8$ and $P_{10}$ of the optical path difference function $\Phi(h)$ to define the diffractive grating. The reference fD denotes focal length of the diffractive grating at 588 nm, Od denotes optical path difference at effective lens radius (h=7.50 mm).

TABLE 2

| Surface #1 | | |
|---|---|---|
| K = 0.00 | $A_4 = -1.4500 \times 10^{-6}$ | $A_6 = -1.6625 \times 10^{-9}$ |
| $P_2 = -9.0130 \times 10^{-2}$ | $P_4 = 7.6558 \times 10^{-5}$ | $P_6 = -3.3013 \times 10^{-8}$ |
| $P_8 = 0.00$ | $P_{10} = 0.00$ | |
| fD = 9941.64 | Od = −4.83λ | |

FIGS. 2A through 2D show third order aberrations of the diffractive-refractive achromatic lens according to the first embodiment:

FIG. 2A shows spherical aberrations at d-line (588 nm), g-line (436 nm) and c-line (656 nm);

FIG. 2B shows a lateral chromatic aberration at the same wavelengths as in FIG. 2A;

FIG. 2C shows an astigmatism (S: Sagittal, M: Meridional); and

FIG. 2D shows distortion.

The vertical axis in FIG. 2A represents F-number, and the vertical axes in FIGS. 2B through 2D respectively represent a half view angle w (degrees) Unit of the horizontal axis is "mm" in each of FIGS. 2A through 2C, and is "percent" in FIG. 2D.

[Second Embodiment]

FIG. 3 shows a diffractive-refractive achromatic lens according to a second embodiment. The numerical construction of the second embodiment is indicated in TABLE 3. The lens of the second embodiment includes a biconvex first lens, a negative meniscus second lens and a diffractive element arranged in this order from an object side. The surface #5 is formed as a diffractive-refractive surface, where the diffractive grating pattern is formed on a spherical surface.

TABLE 3

| | f = 100.01 | Fno. = 6.7 | | |
|---|---|---|---|---|
| Surface Number | r | d | n | vd |
| #1 | 59.407 | 2.00 | 1.51633 | 64.1 |
| #2 | −48.815 | 0.10 | — | — |
| #3 | −48.416 | 1.50 | 1.62004 | 36.3 |
| #4 | −174.336 | 0.20 | — | — |
| #5 | −3150.000 | 1.00 | 1.49176 | 57.4 |
| #6 | INFINITY | | | |

TABLE 4 indicates diffractive coefficients of the diffractive grating. The reference Od denotes optical path difference at effective lens radius (h=7.41 mm). FIGS. 4A through 4D show third order aberrations of the diffractive-refractive achromatic lens according to the second embodiment.

TABLE 4

Surface #5

| | | |
|---|---|---|
| $P_2 = -1.3242 \times 10^{-1}$ | $P_4 = 1.5890 \times 10^{-4}$ | $P_6 = 0.00$ |
| $P_8 = 0.00$ | $P_{10} = 0.00$ | |
| fD = 6426.51 | Od = -6.80λ | |

[Third Embodiment]

Figure 5:
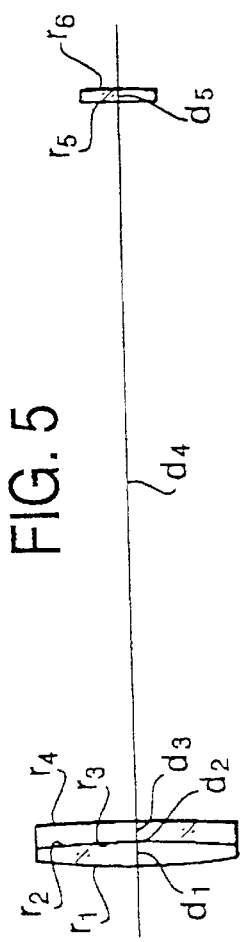
FIG. 5 is a lens diagram of the diffractive-refractive achromatic lens according to a third embodiment.
Figures 6A, 6B, 6C, 6D:
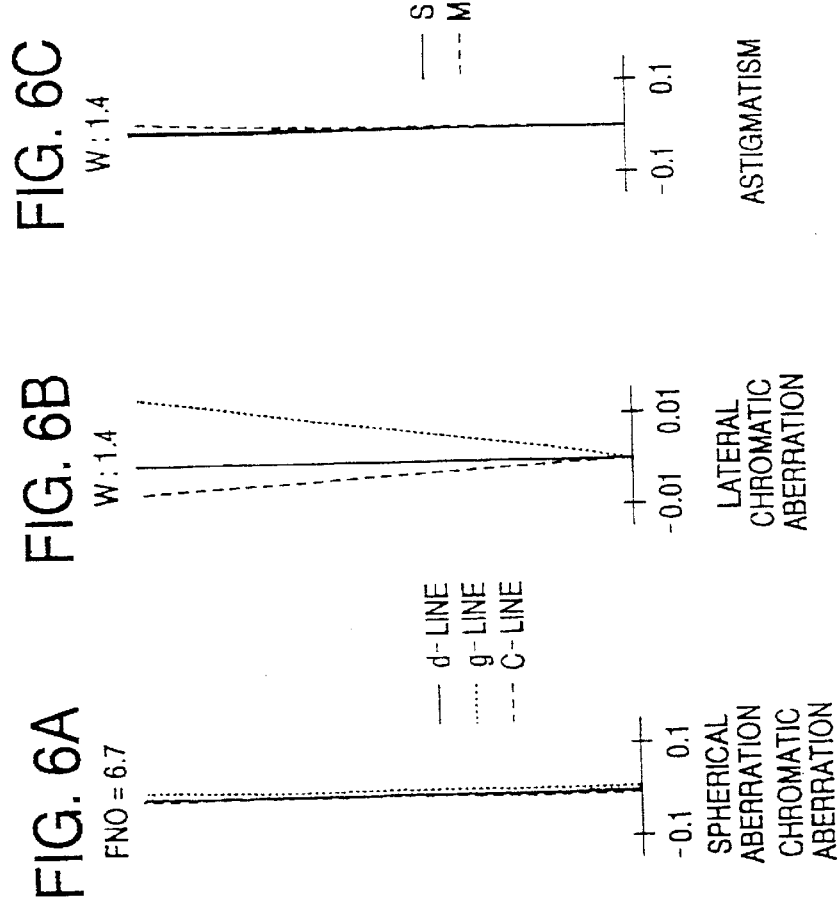
FIGS. 6A through 6D are graphs showing spherical aberration, lateral chromatic aberration, astigmatism and distortion, respectively, of the lens in FIG. 5.

FIG. 5 shows a diffractive-refractive achromatic lens according to a third embodiment. The numerical construction of the third embodiment is indicated in TABLE 5. The lens of the third embodiment includes a biconvex first lens, a negative meniscus second lens and a third lens having small refractive power arranged in this order from an object side. The surface #5 is formed as a diffractive-refractive surface, where the diffractive grating pattern is formed on an aspherical surface. Since the third lens has relatively small power as compared with the first and second lens, it can be considered as a diffractive element.

TABLE 6 indicates conic constant, aspherical coefficients and diffractive coefficients of the surface #5. The reference Od denotes optical path difference at effective lens radius (h=2.82 mm). FIGS. 6A through 6D show third order aberrations of the diffractive-refractive achromatic lens according to the third embodiment.

TABLE 5 f = 100.00    Fno. = 6.7

| Surface Number | r | d | n | vd |
|---|---|---|---|---|
| #1 | 45.168 | 2.00 | 1.48749 | 70.2 |
| #2 | -53.155 | 0.10 | — | — |
| #3 | -51.525 | 1.50 | 1.58144 | 40.7 |
| #4 | -447.325 | 60.00 | — | — |
| #5 | -211.720 | 1.00 | 1.49176 | 57.4 |
| #6 | -352.840 | | | |

TABLE 6

Surface #5

| | | |
|---|---|---|
| K = 0.00 | $A_4 = -6.8500 \times 10^{-7}$ | $A_6 = -1.1280 \times 10^{-7}$ |
| $P_2 = -8.1176 \times 10^{-1}$ | $P_4 = 6.5312 \times 10^{-3}$ | $P_6 = 0.00$ |
| $P_8 = 0.00$ | $P_{10} = 0.00$ | |
| fD = 1048.31 | Od = -6.06λ | |

[Fourth Embodiment]

FIG. 7 shows a diffractive-refractive achromatic lens according to a fourth embodiment. The numerical construction of the fourth embodiment is indicated in TABLE 7.

The lens of the fourth embodiment includes a negative meniscus first lens, a biconvex second lens and a negative meniscus third lens arranged in this order from an object side. In the fourth embodiment, the second and third lenses are an achromatic doublet that is corrected in chromatic aberration at F and C lines, the first lens is an additional refractive lens. In TABLE 7, $f_r$ and $Fno_r$ denote a focal length and F-number of the refractive achromatic lens respectively.

The surface #1 is formed as a diffractive-refractive surface, where the diffractive grating pattern is formed on an aspherical surface.

TABLE 8 indicates conic constant, aspherical coefficients and diffractive coefficients of the surface #1. The reference Od denotes optical path difference at effective lens radius (h=7.50 mm). FIGS. 8A through 8D show third order aberrations of the diffractive-refractive achromatic lens according to the fourth embodiment. FIG. 9 shows the second and third lenses of the lens in FIG. 7, and FIGS. 10A through 10D show various aberrations of the lens in FIG. 9.

TABLE 7 f = 100.02    Fno. = 6.7
$f_r$ = 111.36    $Fno_r$ = 7.4

| Surface Number | r | d | n | vd |
|---|---|---|---|---|
| #1 | 57.214 | 2.00 | 1.58547 | 29.9 |
| #2 | 62.706 | 0.40 | — | — |
| #3 | 64.867 | 2.40 | 1.48749 | 70.2 |
| #4 | -34.525 | 0.10 | — | — |
| #5 | -34.977 | 1.50 | 1.58144 | 40.7 |
| #6 | -146.010 | | | |

TABLE 8

Surface #5

| | | |
|---|---|---|
| K = 0.00 | $A_4 = 7.0875 \times 10^{-8}$ | $A_6 = 0.00$ |
| $P_2 = -1.0845 \times 10^{-1}$ | $P_4 = 1.8897 \times 10^{-4}$ | $P_6 = -3.1170 \times 10^{-8}$ |
| $P_8 = 0.00$ | $P_{10} = 0.00$ | |
| fD = 7846.73 | Od = -5.51λ | |

[Fifth Embodiment]

FIG. 11 shows a diffractive-refractive achromatic lens according to a fifth embodiment. The numerical construction of the fifth embodiment is indicated in TABLE 9.

The lens of the fifth embodiment includes a biconvex first lens, a negative meniscus second lens and a positive meniscus third lens arranged in this order from an object side. In the fifth embodiment, the first and second lenses are an achromatic doublet that is corrected in chromatic aberration at F and C lines, the third lens is an additional refractive lens.

The surface #5 is formed as a diffractive-refractive surface, where the diffractive grating pattern is formed on an aspherical surface.

TABLE 10 indicates conic constant, aspherical coefficients and diffractive coefficients of the surface #5. The reference Od denotes optical path difference at effective lens radius (h=7.43 mm).

Figure 13:
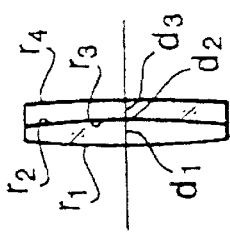
FIG. 13 is a lens diagram of the first and second lenses of the lens in FIG. 11.
Figure 14A:
FIGS. 14A through 14D are graphs showing spherical aberration, lateral chromatic aberration, astigmatism and distortion, respectively, of the lens in FIG. 13.
Figure 14B:
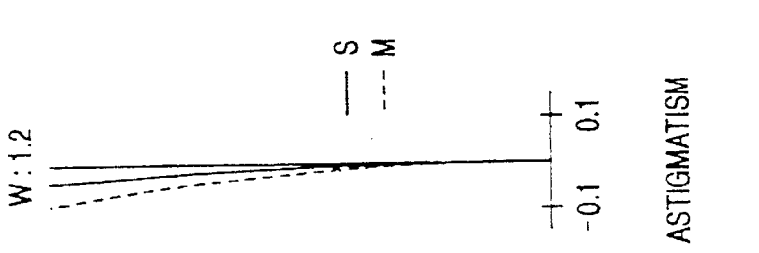
Figure 14C:
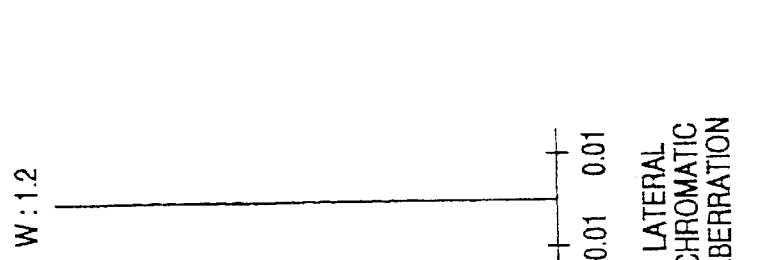
Figure 14D:
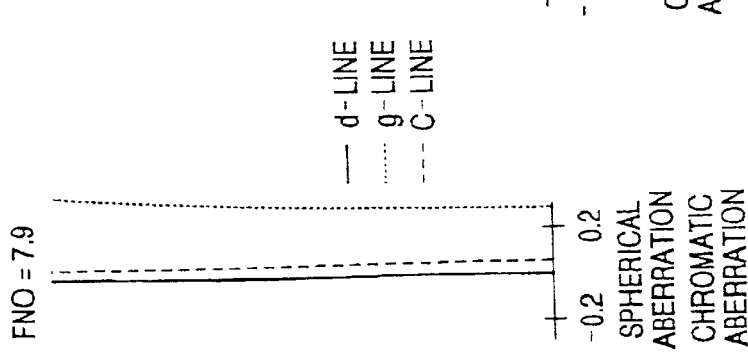

FIGS. 12A through 12D show third order aberrations of the diffractive-refractive achromatic lens according to the fifth embodiment. FIG. 13 shows the first and second lenses of the lens in FIG. 11, and FIGS. 14A through 14D show various aberrations of the lens in FIG. 13.

TABLE 9 f = 100.00    Fno. = 6.7
$f_r$ = 117.77    $Fno_r$ = 7.9

| Surface Number | r | d | n | vd |
|---|---|---|---|---|
| #1 | 73.937 | 2.00 | 1.56384 | 60.7 |
| #2 | -60.319 | 0.10 | — | — |
| #3 | -59.247 | 1.50 | 1.69895 | 30.1 |
| #4 | -210.249 | 0.20 | — | — |
| #5 | 120.000 | 2.00 | 1.58547 | 29.9 |
| #6 | 164.422 | | | |

TABLE 10

Surface #5

| | | |
|---|---|---|
| K = 0.00 | $A_4 = 8.8875 \times 10^{-8}$ | $A_6 = 1.0656 \times 10^{-10}$ |
| $P_2 = -1.3299 \times 10^{-1}$ | $P_4 = 1.1169 \times 10^{-4}$ | $P_6 = -3.6219 \times 10^{-9}$ |
| $P_8 = 0.00$ | $P_{10} = 0.00$ | |
| fD = 6398.79 | Od = $-7.00\lambda$ | |

[Sixth Embodiment]

FIG. 15 shows a diffractive-refractive achromatic lens according to a sixth embodiment. The numerical construction of the sixth embodiment is indicated in TABLE 11.

The lens of the sixth embodiment includes a biconvex first lens, a negative meniscus second lens and a positive meniscus third lens arranged in this order from an object side. In the sixth embodiment, the first and second lenses are an achromatic doublet that is corrected in chromatic aberration at F and C lines, the third lens is an additional refractive lens.

The surface #5 is formed as a diffractive-refractive surface, where the diffractive grating pattern is formed on an aspherical surface.

TABLE 12 indicates conic constant, aspherical coefficients and diffractive coefficients of the surface #5. The reference Od denotes optical path difference at effective lens radius (h=3.64 mm).

Figure 17:
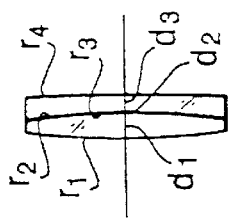
FIG. 17 is a lens diagram of the first and second lenses of the lens in FIG. 15.
Figure 18A:
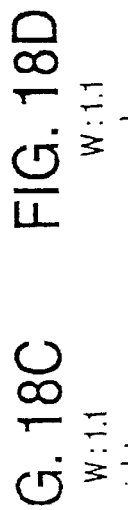
FIGS. 18A through 18D are graphs showing spherical aberration, lateral chromatic aberration, astigmatism and distortion, respectively, of the lens in FIG. 17.
Figure 18B:
Figure 18C:
Figure 18D:
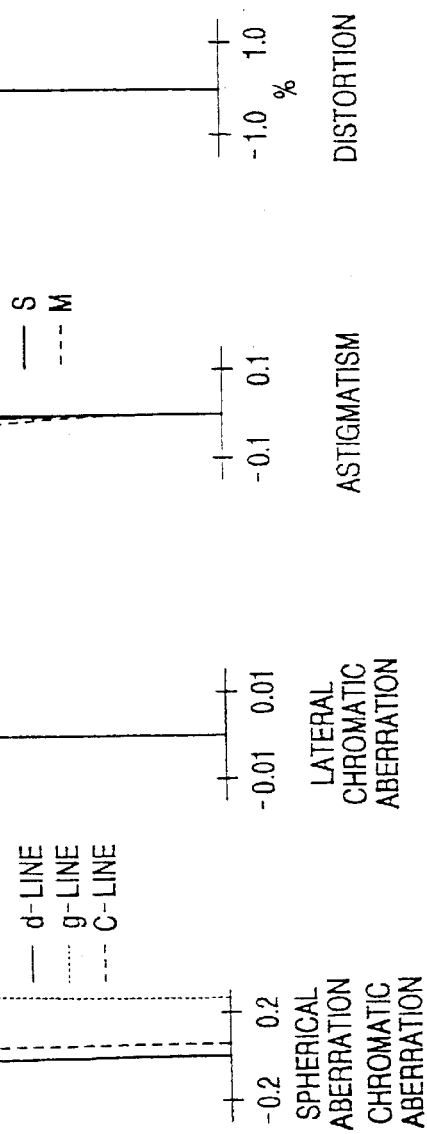

FIGS. 16A through 16D show third order aberrations of the diffractive-refractive achromatic lens according to the sixth embodiment. FIG. 17 shows the first and second lenses of the lens in FIG. 15, and FIGS. 18A through 18D show various aberrations of the lens in FIG. 17.

TABLE 11

| | f = 99.77 | Fno. = 6.7 | | |
|---|---|---|---|---|
| | $f_I = 120.20$ | $Fno_I = 8.0$ | | |
| Surface Number | r | d | n | vd |
| #1 | 69.458 | 2.00 | 1.51633 | 64.1 |
| #2 | -43.512 | 0.10 | — | — |
| #3 | -43.907 | 1.50 | 1.62004 | 36.3 |
| #4 | -197.233 | 60.00 | — | — |
| #5 | 70.000 | 0.80 | 1.59270 | 35.3 |
| #6 | 112.313 | | | |

TABLE 12

Surface #5

| | | |
|---|---|---|
| K = 0.00 | $A_4 = 2.3630 \times 10^{-6}$ | $A_6 = -4.2500 \times 10^{-8}$ |
| $P_2 = -2.2042 \times 10^{-1}$ | $P_4 = 2.7634 \times 10^{-3}$ | $P_6 = -4.8079 \times 10^{-5}$ |
| $P_8 = 0.00$ | $P_{10} = 0.00$ | |
| fD = 3860.79 | Od = $-2.55\lambda$ | |

[Seventh Embodiment]

FIG. 19 shows a diffractive-refractive achromatic lens according to a seventh embodiment. The numerical construction of the seventh embodiment is indicated in TABLE 13.

The lens of the seventh embodiment includes a biconvex first lens, a negative meniscus second lens and a negative meniscus third lens having a strong positive surface directed to the second lens arranged in this order from an object side. In the seventh embodiment, the first and second lenses are an achromatic doublet that is corrected in chromatic aberration at F and C lines, the third lens is an additional refractive lens.

The surface #5 is formed as a diffractive-refractive surface, where the diffractive grating pattern is formed on an aspherical surface.

Figure 21:
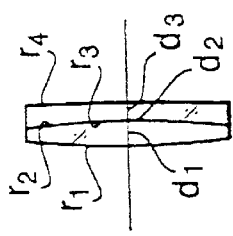
FIG. 21 is a lens diagram of the first and second lenses of the lens in FIG. 19.
Figures 22A, 22B, 22C, 22D:
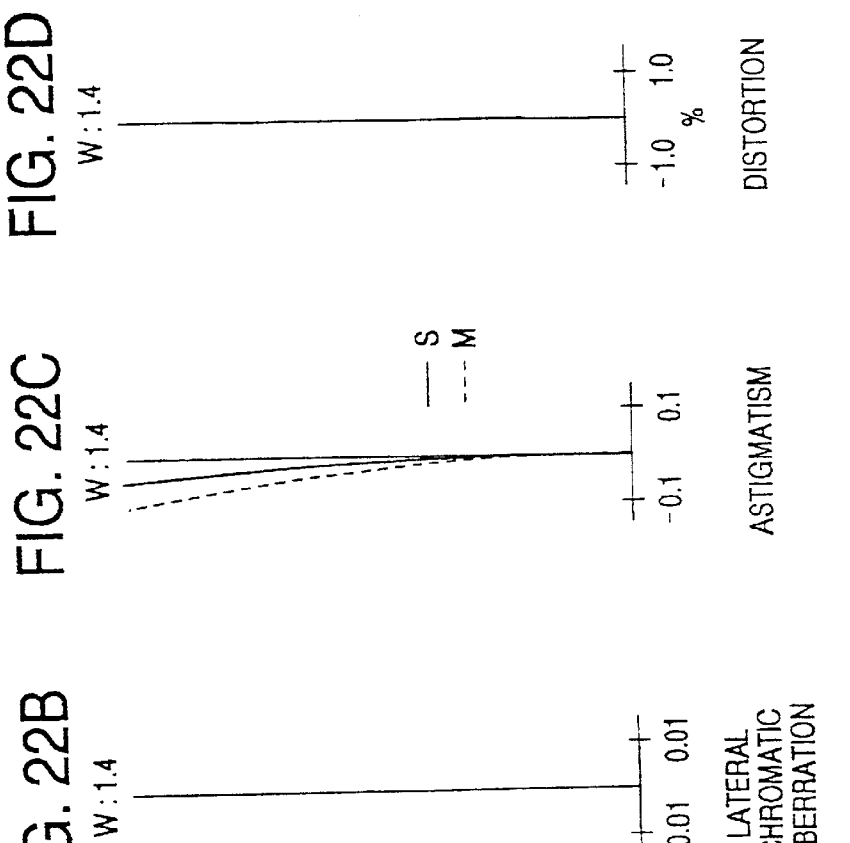
FIGS. 22A through 22D are graphs showing spherical aberration, lateral chromatic aberration, astigmatism and distortion, respectively, of the lens in FIG. 21.

TABLE 14 indicates conic constant, aspherical coefficients and diffractive coefficients of the surface #5. The reference Od denotes optical path difference at effective lens radius (h=6.53 mm). FIGS. 20A through 20D show third order aberrations of the diffractive-refractive achromatic lens according to the seventh embodiment. FIG. 21 shows the first and second lenses of the lens in FIG. 19, and FIGS. 22A through 22D show various aberrations of the lens in FIG. 21.

TABLE 13

| | f = 99.91 | Fno. = 6.7 | | |
|---|---|---|---|---|
| | $f_I = 99.75$ | $Fno_I = 6.7$ | | |
| Surface Number | r | d | n | vd |
| #1 | 59.933 | 2.00 | 1.51633 | 64.1 |
| #2 | -36.542 | 0.10 | — | — |
| #3 | -36.744 | 1.50 | 1.62004 | 36.3 |
| #4 | -148.848 | 10.00 | — | — |
| #5 | 18.582 | 4.00 | 1.58547 | 29.9 |
| #6 | 16.446 | | | |

TABLE 14

Surface #5

| | | |
|---|---|---|
| K = 0.00 | $A_4 = 2.1630 \times 10^{-7}$ | $A_6 = -3.4690 \times 10^{-10}$ |
| $P_2 = -1.7232 \times 10^{-1}$ | $P_4 = 2.4483 \times 10^{-4}$ | $P_6 = -7.0432 \times 10^{-7}$ |
| $P_8 = -8.7601 \times 10^{-10}$ | $P_{10} = 0.00$ | |
| fD = 4938.56 | Od = $-6.97\lambda$ | |

[Eighth Embodiment]

FIG. 23 shows a diffractive-refractive achromatic lens according to an eighth embodiment. The numerical construction of the eighth embodiment is indicated in TABLE 15.

The lens of the eighth embodiment includes a biconvex first lens, a negative meniscus second lens and a negative meniscus third lens having a strong positive surface directed to the second lens arranged in this order from an object side. In the eighth embodiment, the first and second lenses are an achromatic doublet that is corrected in chromatic aberration at F and C lines, the third lens is an additional refractive lens.

The surface #5 is formed as a diffractive-refractive surface, where the diffractive grating pattern is formed on an aspherical surface.

TABLE 16 indicates conic constant, aspherical coefficients and diffractive coefficients of the surface #5. The reference Od denotes optical path difference at effective lens radius (h=2.47 mm).

FIGS. 24A through 24D show third order aberrations of the diffractive-refractive achromatic lens according to the eighth embodiment. FIG. 25 shows the first and second lenses of the lens in FIG. 23, and FIGS. 26A through 26D show various aberrations of the lens in FIG. 25.

TABLE 15

| | f = 99.87 | Fno. = 6.7 | | |
|---|---|---|---|---|
| | $f_I = 100.09$ | $Fno_I = 6.7$ | | |
| Surface Number | r | d | n | vd |
| #1 | 55.814 | 2.00 | 1.48749 | 70.2 |
| #2 | -31.820 | 0.10 | — | — |
| #3 | -32.214 | 1.50 | 1.58144 | 40.7 |

TABLE 15-continued

| | f = 99.87 | Fno. = 6.7 | | |
| | $f_I$ = 100.09 | $Fno_I$ = 6.7 | | |
| Surface Number | r | d | n | νd |
|---|---|---|---|---|
| #4 | −145.714 | 64.66 | — | — |
| #5 | 5.721 | 1.60 | 1.58547 | 29.9 |
| #6 | 4.925 | | | |

TABLE 16

Surface #5

| | | |
|---|---|---|
| K = 0.00 | $A_4$ = 7.4250 × 10$^{-6}$ | $A_6$ = −6.1250 × 10$^{-7}$ |
| $P_2$ = −5.6218 × 10$^{-1}$ | $P_4$ = 1.3406 × 10$^{-2}$ | $P_6$ = −3.3350 × 10$^{-4}$ |
| $P_8$ = −3.6072 × 10$^{-6}$ | $P_{10}$ = −7.1764 × 10$^{-8}$ | |
| fD = 1513.70 | Od = −3.02λ | |

[Ninth Embodiment]

FIG. 27 shows a diffractive-refractive achromatic lens according to a ninth embodiment. The numerical construction of the ninth embodiment is indicated in TABLE 17.

The lens of the ninth embodiment includes a biconvex first lens, a negative meniscus second lens and a negative meniscus third lens having a strong positive surface directed to the second lens arranged in this order from an object side. In the ninth embodiment, the first and second lenses are an achromatic doublet that is corrected in chromatic aberration at F and C lines, the third lens is an additional refractive lens.

The surface #5 is formed as a diffractive-refractive surface, where the diffractive grating pattern is formed on an aspherical surface.

TABLE 18 indicates conic constant, aspherical coefficients and diffractive coefficients of the surface #5. The reference Od denotes optical path difference at effective lens radius (h=2.08 mm). FIGS. 28A through 28D show third order aberrations of the diffractive-refractive achromatic lens according to the ninth embodiment. FIG. 29 shows the first and second lenses of the lens in FIG. 27, and FIGS. 30A through 30D show various aberrations of the lens in FIG. 29.

TABLE 17

| | f = 99.90 | Fno. = 6.7 | | |
| | $f_I$ = 100.09 | $Fno_I$ = 6.7 | | |
| Surface Number | r | d | n | νd |
|---|---|---|---|---|
| #1 | 63.392 | 2.00 | 1.61272 | 58.7 |
| #2 | −62.334 | 0.10 | | |
| #3 | −59.861 | 1.50 | 1.72825 | 28.5 |
| #4 | −273.305 | 70.04 | — | — |
| #5 | 5.165 | 3.00 | 1.58547 | 29.9 |
| #6 | 3.639 | | | |

TABLE 18

5th surface

| | | |
|---|---|---|
| K = 0.00 | $A_4$ = −1.3600 × 10$^{-5}$ | $A_6$ = −1.2400 × 10$^{-6}$ |
| $P_2$ = −1.4507 | $P_4$ = 1.0298 × 10$^{-3}$ | $P_6$ = −5.4482 × 10$^{-4}$ |
| $P_8$ = −9.9781 × 10$^{-6}$ | $P_{10}$ = −2.4949 × 10$^{-7}$ | |
| fD = 586.60 | Od = −6.31λ | |

The following TABLE 19 shows the values of the first to ninth embodiments for conditions (1) to (8).

TABLE 19

| | Embodiments | | | |
|---|---|---|---|---|
| Conditions | 1 | 2 | 3 | 4 |
| (1) $f/f_D$ | 0.011 | 0.016 | 0.095 | 0.013 |
| (2) $P_4/P_2$ | −0.0009 | −0.0012 | −0.0080 | −0.0017 |
| (3) $f_c \cdot \Sigma\{1/(f_i \cdot \nu_i)\}$ | 0.0025 | 0.0045 | 0.0038 | — |
| (4) $|f_I \cdot \Sigma\{1/(f_i \cdot \nu_i)\}|$ | — | — | — | 0.0004 |
| (5) $(f_p \cdot \nu_p)/f$ | — | — | — | 0.329 |
| (6) $r_{III}/(f_I - L)$ | — | — | — | — |
| (7) $d_{II}/f$ | — | — | — | — |
| (8) L/f | — | — | 0.600 | — |

| | Embodiments | | | | |
|---|---|---|---|---|---|
| Conditions | 5 | 6 | 7 | 8 | 9 |
| (1) | 0.016 | 0.026 | 0.020 | 0.066 | 0.170 |
| (2) | −0.0008 | −0.0125 | −0.0014 | −0.0238 | −0.0007 |
| (3) | — | — | — | — | — |
| (4) | 0.0003 | 0.0002 | 0.0004 | 0.0004 | 0.0002 |
| (5) | 0.250 | 0.088 | — | — | — |
| (6) | — | — | 0.207 | 0.161 | 0.172 |
| (7) | — | — | 0.040 | 0.016 | 0.030 |
| (8) | — | 0.601 | — | 0.647 | 0.701 |

Each of the embodiments satisfies conditions directed thereof, and is suitable to the achromatic lens such as a collimator lens or an objective lens of a telescope.

The present disclosure relates to the subject matter contained in Japanese Patent Application No. HEI 10-24789, filed on Feb. 5, 1998, which is expressly incorporated herein by reference in its entirety.

What is claimed is:

1. A diffractive-refractive achromatic lens that has a positive resultant power, said lens comprising:

a refractive lens system with a positive lens having relatively small dispersion, a negative lens having relatively large dispersion and an additional refractive lens, said additional refractive lens consisting of an additional positive lens, said refractive lens system exhibiting longitudinal chromatic aberration that is substantially proportional to wavelength such that the back focus of said refractive lens system decreases as the wavelength becomes shorter; and a positive diffractive grating that corrects the longitudinal chromatic aberration of said refractive lens system, wherein the following condition is satisfied:

$$0.005 < f/f_D < 0.2$$

where f is focal length of the entire lens system, and $f_D$ is focal length of said positive diffractive grating, wherein said refractive lens system comprises a refractive achromatic lens that is corrected in chromatic aberration at two different wavelengths, and said additional refractive lens generates longitudinal chromatic aberration such that the back focus of said refractive lens system decreases as the wavelength becomes shorter.

2. The diffractive-refractive achromatic lens according to claim 1, wherein the following condition is satisfied:

$$0.05 < (f_p \cdot \nu_p)/f < 0.5$$

where $f_p$ is a focal length of said additional positive lens,
$\nu_p$ is an Abbe number of said additional positive lens, and f is a focal length of the entire lens system.

3. The diffractive-refractive achromatic lens according to claim 1, wherein said diffractive grating is formed on one surface of said additional positive lens.

4. The diffractive-refractive achromatic lens according to claim 3, wherein said additional positive lens is arranged at a convergent side of said refractive achromatic lens and the following condition is satisfied:

$$0.4 < L/f < 0.9$$

where

L is an air gap along an optical axis between said refractive achromatic lens and said additional refractive lens.

5. A diffractive-refractive achromatic lens that has a positive resultant power, said lens comprising:

a refractive achromatic lens that is corrected in chromatic aberration at two different wavelengths;

an additional positive lens that generates longitudinal chromatic aberration such that the back focus of the refractive lens system, which includes said refractive achromatic lens and said additional positive lens, decreases as the wavelength becomes shorter; and a positive diffractive grating that corrects said longitudinal chromatic aberration of said refractive lens system, wherein the following condition is satisfied:

$$\left| f_I \cdot \sum_{i=1}^{m} \frac{1}{f_i \cdot v_i} \right| < 0.002$$

where $f_I$ is a focal length of said refractive achromatic lens, $f_i$ is a focal length of an i-th lens of said refractive achromatic lens counted from an object side, $v_i$ is an Abbe number of said i-th lens of said refractive achromatic lens counted from the object side, and m is a total number of lenses of said refractive achromatic lens.

6. The diffractive-refractive achromatic lens according to claim 5, wherein the following condition is satisfied:

$$0.05 < (f_p \cdot v_p)/f < 0.5$$

where $f_p$ is a focal length of said additional positive lens, $v_p$ is an Abbe number of said additional positive lens, and f is a focal length of the entire lens system.

7. The diffractive-refractive achromatic lens according to claim 5, wherein said diffractive grating is formed on one surface of said additional positive lens.

8. A diffractive-refractive achromatic attachment that is attached to a refractive achromatic lens that is corrected in chromatic aberration at two different wavelengths, said attachment comprising:

an additional refractive lens that generates longitudinal chromatic aberration such that the back focus of the refractive lens system, which includes said refractive achromatic lens and said additional refractive lens, decreases as the wavelength becomes shorter, said additional refractive lens comprising an additional positive lens; and a positive diffractive grating that corrects the longitudinal chromatic aberration of said refractive lens system.

9. The diffractive-refractive achromatic attachment according to claim 8, wherein said diffractive grating is formed on one surface of said additional positive lens.

10. A diffractive-refractive achromatic attachment that is attached to a refractive achromatic lens that is corrected in chromatic aberration at two different wavelengths, said attachment comprising:

an additional refractive lens that generates longitudinal chromatic aberration such that the back focus of the refractive lens system, which includes said refractive achromatic lens and said additional refractive lens, decreases as the wavelength becomes shorter; and a positive diffractive grating that corrects said longitudinal chromatic aberration of said refractive lens system, wherein the following condition is satisfied:

$$0.05 < (fp \cdot vp)/f < 0.5$$

where fp is a focal length of said additional refractive lens, vp is an Abbe number of said additional refractive lens, and f is a focal length of the entire lens system including said refractive achromatic lens.

* * * * *